Patented Feb. 7, 1933

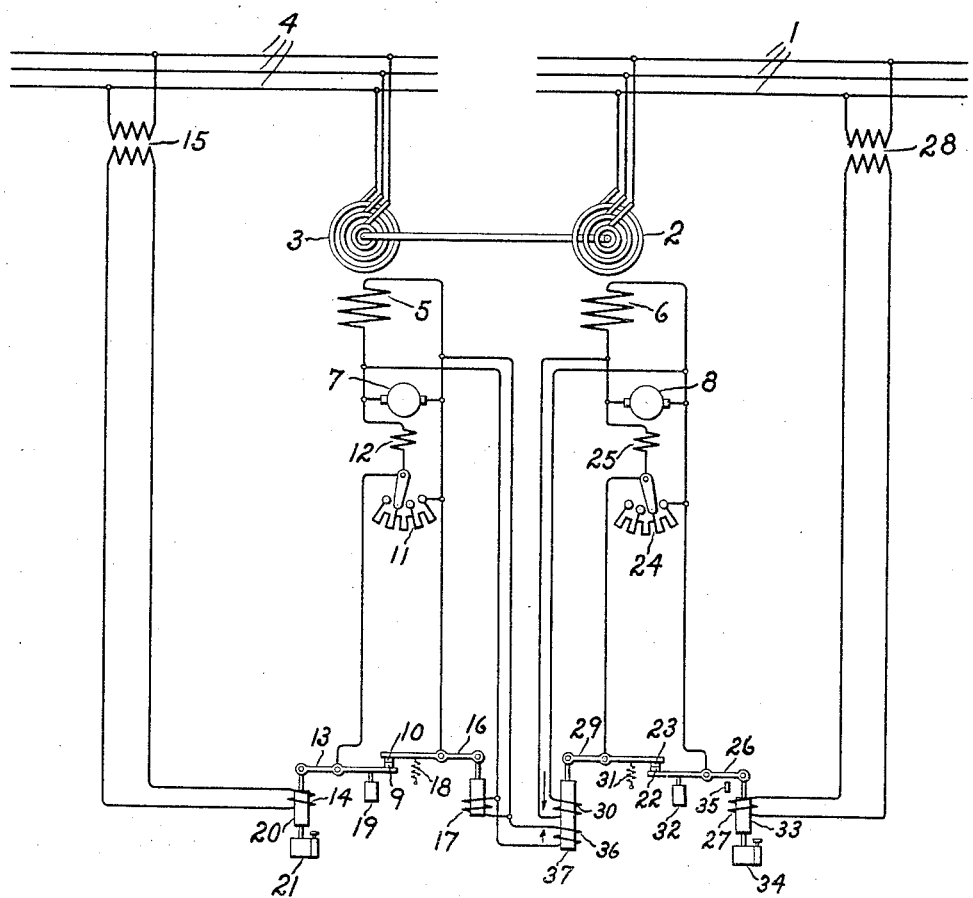

1,896,862

UNITED STATES PATENT OFFICE

ROBERT M. CAROTHERS AND LOUIS W. THOMPSON, OF SCHENECTADY, NEW YORK, ASSIGNORS TO GENERAL ELECTRIC COMPANY, A CORPORATION OF NEW YORK

REGULATING SYSTEM

Application filed September 6, 1929. Serial No. 390,823.

Our invention relates to regulating systems and especially to an automatic regulating system for frequency changer sets.

Frequency changer sets, which as a rule comprise a synchronous motor operating from a supply line at one frequency for driving a synchronous generator or alternator for supplying current to load devices at a different frequency, are not inherently self-regulating as to alternator terminal voltage, motor power factor, motor pull out torque, etc., for different generator outputs. Thus, as the load on the alternator increases it is very desirable to provide means to hold the alternator terminal voltage constant, to regulate the motor so that its power factor will remain constant, and to increase its pull out torque.

While we have shown our invention as applied to frequency changer sets it will of course be obvious to those skilled in the art that its use is not so limited, and that it may readily be used in connection with the automatic regulation of motor generator sets, as where a synchronous motor drives a direct current generator, without departing from our invention in its broader aspects.

It is an object of our invention to provide an improved regulating system, and more particularly a system for automatically regulating the characteristics of motor-generator sets in which the motor is of the synchronous type.

Our invention will be better understood from the following description taken in connection with the accompanying drawing, and its scope will be pointed out in the appended claims.

Referring now to the drawing, the single figure of which is a diagrammatic representation of our system, 1 is an alternating current supply line, which as shown, is a three phase line and which for purposes of illustration will be considered to have a frequency of 60 cycles. This line supplies power to synchronous motor 2, which is mechanically connected to alternator 3, the latter feeding line 4 at a frequency of 25 cycles for example.

Connected across field windings 5 and 6 of the alternator and motor respectively are direct current exciting generators or exciters 7 and 8. Applied to exciter 7 is a vibratory voltage regulator of the well known Tirrill type comprising a pair of contacts 9 and 10 which are arranged to short circuit a resistance 11, which is in series with the shunt field 12 of exciter 7. Contact 9, as shown, is mounted on one end of pivoted arm 13, which end also carries a weight 19 for bringing the lever and core 20 to a point of equilibrium. A main control coil 14 is provided for moving core 20. This coil is connected to potential transformer 15 whose primary is connected to the output line of the alternator. When the line voltage of the alternator is normal, the arm 13 is balanced and contact 9 is stationary, but when the line voltage departs from normal the arm 13 becomes unbalanced and contact 9 moves up or down, depending upon whether the voltage falls or rises respectively. The tilting of arm 13 is retarded by dashpot 21. Contact 10, through pivoted arm 16 and coil 17, which is connected across the exciter 7, takes up a position which varies with the voltage of exciter 7. Opposing the effect of coil 17 is spring 18. In actual practice there are three or four springs 18 which are arranged to cumulate their effects as contact 10 rises; also the well known auxiliary differential relay would probably be used to short-circuit resistance 11, instead of using contacts 9 and 10 directly, as shown. For purposes of simplicity, however, these elements have been omitted from the drawing.

Briefly described, the operation of the voltage regulator is as follows: When contacts 9 and 10 are touching, which is the position in which they are shown, resistance 11 is short-circuited, hence the current in field 12 of exciter 7 rises, which has the effect of raising the terminal voltage of said exciter. As soon as the terminal voltage of exciter 7 rises, the current through coil 17 increases, hence its effective pull increases and contact 10 rises, breaking the engagement with contact 9. This break has the immediate effect of inserting resistance 11 in the field circuit of exciter 7 and the remote effect of causing contact 10 to again engage contact 9, through the decrease in exciter voltage weakening the pull of coil 17. The above described motion of contact 10 is so rapid that in view of the relatively large inductance of the field 5 of the alternator, the current therein is practically constant, and hence the terminal voltage of the alternator is practically constant. Therefore, contact 9, whose position is regulated by the alternator voltage, through potential transformer 15 and coil 14, remains stationary. If, however, the alternator terminal voltage should change, for example, if it should drop as a result of increase of load, arm 13 would become unbalanced and contact 9 would tend to rise. This tendency of contact 9 to rise prevents contact 10 from so readily leaving it, hence causing resistance 11 to be short-circuited for a longer period of time and thus in turn raising the terminal voltage of the alternator. Similarly, if the alternator voltage increases, the tendency of contact 9 is to fall, which results in a compensatory decrease in exciter voltage.

Applied to exciter 8 of synchronous motor 2 is another voltage regulator of the Tirrill type in which elements 22–34 correspond respectively to elements 9–21 of the regulator applied to exciter 7. This regulator, however, differs from the previously described regulator in that it is provided with a limit stop 35 for the arm 26 and an additional winding 36 is mounted adjacent to and in axial alignment with coil 30 on core 37. This winding 36 is connected across the terminal of exciter 7 and is so connected that its magnetomotive force opposes that of winding 30.

The operation of our system is as follows: Assuming an increase in load on alternator 3, its terminal voltage will decrease. This in turn will cause its voltage regulator to increase its exciter voltage in order to bring the terminal voltage back to normal. The increase in the voltage of exciter 7 causes an increase in current through coil 36 and this in turn causes a weakening in the effect of coil 30 on core 37, causing contact 23 to remain longer in engagement with contact 22, hence raising the terminal voltage of exciter 8 and the excitation of motor 2. As the load which is placed on the alternator 3 is transmitted through the mechanical coupling to motor 2, the effect on the motor will be to make it take a lagging current sufficient to compensate for the increased power output of the motor. If the load is increased beyond a certain point without increasing the excitation of the motor, it will pull out of synchronism, when of course its torque will drop to zero. Also in order to bring the lagging current caused by loading the motor in phase with the impressed voltage or in other words, in order to bring the motor power factor to unity, it is necessary to increase the motor excitation. Therefore, our regulating system has not only the effect of maintaining the alternator voltage constant but of increasing the motor excitation with increase in load. If the regulator on the exciter 8 is adjusted for a predetermined power factor of the motor for normal load, the pulls of the coils 30 and 36 may be so proportioned that the motor power factor will be maintained at the predetermined value for considerable variation in load. The increase in excitation necessary to maintain the predetermined power factor, for example, unity power factor, as the load increases is sufficient to prevent the motor power pulling out of synchronism. If, however, it is found desirable to run the motor with a loading current or over-excited our system may also be designed to hold the power factor constant under these conditions, as the load varies.

We have described the operation of our system only for the case when the load increases, it will be obvious however to those skilled in the art, that a decrease in load will produce such a decrease in the field excitation of motor 2 through the action of its associate regulator as to hold the power factor constant.

While we have shown and described a particular embodiment of our invention, it will be obvious to those skilled in the art that changes and modifications may be made without departing from our invention and we therefore aim in the appended claims to cover all such changes and modifications as fall within the true spirit and scope of our invention.

What we claim as new and desire to secure by Letters Patent of the United States is:—

1. In combination, a generator mechanically coupled to a synchronous motor, automatic means for varying the field excitation of the generator so as to maintain substantially constant terminal voltage regardless of the load on said generator, and means responsive to the variations in the field excitation of said generator for causing corresponding variations in the field excitation of said synchronous motor.

2. In a synchronous frequency changer set, means for maintaining the terminal voltage of the alternator of said frequency changer set substantially constant at all loads through control of the field excitation of said alternator, and means responsive to variations in field excitation of said alternator for producing corresponding changes in the field excitation of the synchronous motor of said frequency changer set.

3. In a regulating system, an alternator, a synchronous motor, mechanical coupling means between said alternator and said motor, automatic voltage regulating means for maintaining the terminal voltage of said alternator substantially constant regardless of the load thereon through control of the field excitation of said alternator, and means responsive to changes in the field excitation of said alternator for producing corresponding changes in the field excitation of said motor.

4. In combination, an alternator, a synchronous motor, mechanical coupling means between said alternator and said motor, a separate field exciter for said alternator and for said motor respectively, automatic voltage regulators applied to said exciters, and means responsive to variations in the exciter voltage of said alternator for causing the voltage regulator applied to the exciter of said motor to produce corresponding variations in the exciter voltage of said motor.

5. In combination, a pair of synchronous machines one of which is operated as a motor, means mechanically coupling said machines together whereby the other machine operates as a generator, means for maintaining the terminal voltage of the generator substantially constant at all loads, an exciter for the field of the motor, and means operative in accordance with the operation of said voltage regulating means of the generator for varying the voltage of said exciter in proportion to variations in load on said generator.

6. In combination, two synchronous machines, an exciter and a vibratory contact type voltage regulator for each machine, a source of alternating current connected to one machine whereby it operates as a synchronous motor, coupling means between said two machines whereby the second machine is driven as an alternator, and means responsive to the generator exciter voltage for causing the motor regulator to proportionately change the exciter voltage of the motor.

7. In combination, two distribution circuits, a synchronous motor connected to one of said circuits, a generator connected to the other of said circuits, a mechanical coupling between said motor and generator, a separate exciter for each of said machines, a regulator for said generator exciter, a regulator for said motor exciter including an operating winding connected to be responsive to an electrical condition of the motor field winding, and means responsive to an electrical condition of the generator field winding for modifying the action of said operating winding.

8. In combination, two distribution circuits, a synchronous motor connected to one of said circuits, a generator connected to the other of said circuits, a mechanical coupling between said motor and generator, a separate exciter for each of said machines, a vibratory type of regulator for said generator exciter for maintaining the voltage of said generator substantially constant, a vibratory type of regulator for said motor exciter including an operating winding connected to be responsive to the voltage of said motor field winding, and means responsive to the voltage of said generator field winding for modifying the action of said regulator for said motor exciter.

9. In combination, a power supply circuit, a synchronous motor energized thereby, a load device operated by said motor, a regulator responsive to an operating condition of said motor for maintaining an electrical condition of said motor substantially constant, and means operative in accordance with a function of the power demand of said load device for continuously modifying the action of said regulator.

10. In combination, a power supply circuit, a synchronous motor connected to be energized from said circuit, a load device operated by said motor, a vibratory contact voltage regulator for regulating the voltage applied to said motor, said regulator including an anti-hunting coil, means including a coil for opposing the effect of said anti-hunting coil, and means for energizing said coil in accordance with variations in a function of the power demand of said load device.

In witness whereof, we have hereunto set our hands this 5th day of September, 1929.

ROBERT M. CAROTHERS.
LOUIS W. THOMPSON.